United States Patent
Lee et al.

(10) Patent No.: US 12,027,808 B2
(45) Date of Patent: Jul. 2, 2024

(54) CABLE TELEVISION APPARATUS WITH SCREWLESS CLAMPING CONNECTOR STRUCTURE

(71) Applicant: CABLE VISION ELECTRONICS CO., LTD., New Taipei (TW)

(72) Inventors: Chien-Chung Lee, New Taipei (TW); Yu-An Chen, New Taipei (TW); Cheng-Wei Kuo, New Taipei (TW)

(73) Assignee: CABLE VISION ELECTRONICS CO., LTD., New Taipei (TW)

( * ) Notice: Subject to any disclaimer, the term of this patent is extended or adjusted under 35 U.S.C. 154(b) by 390 days.

(21) Appl. No.: 17/545,997

(22) Filed: Dec. 8, 2021

(65) Prior Publication Data
US 2023/0054506 A1    Feb. 23, 2023

(30) Foreign Application Priority Data

Aug. 20, 2021 (TW) ................................. 110209887

(51) Int. Cl.
| | |
|---|---|
| *H01R 9/05* | (2006.01) |
| *F16M 11/04* | (2006.01) |
| *H01R 13/02* | (2006.01) |
| *H01R 13/58* | (2006.01) |

(52) U.S. Cl.
CPC .......... *H01R 9/0515* (2013.01); *F16M 11/041* (2013.01); *H01R 13/025* (2013.01); *H01R 13/5812* (2013.01); *H01R 2201/18* (2013.01)

(58) Field of Classification Search
CPC .............. H01R 13/025; H01R 13/5812; H01R 2201/18; H01R 9/0515; F16M 11/041

USPC .......................................................... 439/224
See application file for complete search history.

(56) References Cited

U.S. PATENT DOCUMENTS

| | | | | |
|---|---|---|---|---|
| 6,067,441 A | * | 5/2000 | Pan ........................ | H03H 7/461 333/132 |
| 6,230,391 B1 | * | 5/2001 | Chilton ................ | H01R 24/547 29/750 |
| 6,254,399 B1 | * | 7/2001 | Huang .................. | H01R 9/0515 439/63 |
| 6,625,001 B2 | * | 9/2003 | Tseng ..................... | H04N 7/104 361/48 |
| 6,780,038 B1 | * | 8/2004 | Huang .................. | H01R 13/113 439/640 |
| 7,669,316 B2 | * | 3/2010 | Johnsen ............... | H01R 24/547 29/857 |

(Continued)

FOREIGN PATENT DOCUMENTS

WO    WO-2004004078 A1 *   1/2004   .......... H01R 24/547

OTHER PUBLICATIONS

DE4005142 w/translation (Year: 1991).*

*Primary Examiner* — Marcus E Harcum
(74) *Attorney, Agent, or Firm* — Chun-Ming Shih; HDLS IPR SERVICES (57) ABSTRACT

A cable television apparatus with a screwless clamping connector structure includes a support structure and at least one rotary connector structure which includes a screwless clamping connection part and a printed circuit board connection part, wherein the screwless clamping connection part includes a first end part which defines an opening to receive a coaxial cable core of a coaxial cable. The at least one rotary connector structure can be rotated to change an opening direction of the opening.

6 Claims, 11 Drawing Sheets

(56) References Cited

U.S. PATENT DOCUMENTS

| | | | |
|---|---|---|---|
| 8,926,346 B2* | 1/2015 | Hsu | H01R 13/6675 |
| | | | 439/224 |
| 2003/0040220 A1* | 2/2003 | Yang | H01R 24/547 |
| | | | 439/579 |
| 2007/0128930 A1* | 6/2007 | Cooper | H01R 24/42 |
| | | | 439/581 |
| 2012/0278850 A1* | 11/2012 | Lee | H01R 13/719 |
| | | | 725/127 |
| 2016/0164199 A1* | 6/2016 | Hashimoto | H01R 9/0518 |
| | | | 439/578 |
| 2020/0106215 A1* | 4/2020 | Montena | H01R 13/5812 |
| 2022/0271485 A1* | 8/2022 | Bristol | G06F 1/1605 |

\* cited by examiner

CABLE TELEVISION APPARATUS WITH SCREWLESS CLAMPING CONNECTOR STRUCTURE

BACKGROUND OF THE DISCLOSURE

Technical Field

The present disclosure relates to a cable television apparatus, and especially relates to a cable television apparatus with a screwless clamping connector structure.

Description of Related Art

At present, the cable television systems are very common, which transmit the television programs and the network signals to the clients through the coaxial cables. On the network of the cable television system, there are many related art cable television apparatuses used to process the signals, and each of these related art cable television apparatuses usually has a plurality of holes for connecting to the coaxial cables in different directions, so that the technician can select the holes of the related art cable television apparatus used to connect to the coaxial cables according to the on-site construction requirements. However, the related art cable television apparatus has the disadvantage that it is difficult to connect the coaxial cables to the related art cable television apparatus, and the high frequency characteristics are not good.

SUMMARY OF THE DISCLOSURE

In order to solve the above-mentioned problems, an object of the present disclosure is to provide a cable television apparatus with a screwless clamping connector structure.

In order to achieve the object of the present disclosure mentioned above, the cable television apparatus of the present disclosure is applied to at least one coaxial cable which includes a coaxial cable core, and the cable television apparatus is applied to a signal frequency of 1.8 GHz or more, and the cable television apparatus is applied to a current of 10 amperes or more. The cable television apparatus includes a support structure and at least one rotary connector structure which is assembled to the support structure. Moreover, the at least one rotary connector structure includes a screwless clamping connection part and a printed circuit board connection part which is assembled to the support structure and the screwless clamping connection part, wherein the screwless clamping connection part includes a first end part which is configured to define an opening to receive the coaxial cable core of the at least one coaxial cable. The at least one rotary connector structure is configured to be rotated to change an opening direction of the opening defined by the first end part of the screwless clamping connection part.

Moreover, in an embodiment of the cable television apparatus of the present disclosure mentioned above, the at least one rotary connector structure further includes a surrounding body assembled to the support structure, the screwless clamping connection part and the printed circuit board connection part; the surrounding body is configured to cover the screwless clamping connection part to be assembled to the support structure.

Moreover, in an embodiment of the cable television apparatus of the present disclosure mentioned above, the surrounding body is configured to bind the first end part of the screwless clamping connection part, so that the first end part of the screwless clamping connection part is configured to use the surrounding body to clamp the coaxial cable core of the at least one coaxial cable. The first end part of the screwless clamping connection part is configured to include a concave waist part.

Moreover, in an embodiment of the cable television apparatus of the present disclosure mentioned above, the screwless clamping connection part is configured to define a plurality of elastic grooves on the first end part which is configured to use the concave waist part and the elastic grooves to increase a clamping force of the first end part to the coaxial cable core of the at least one coaxial cable.

Moreover, in an embodiment of the cable television apparatus of the present disclosure mentioned above, the screwless clamping connection part further includes a middle section connected to the first end part, and at least one fixing bump which is arranged on the middle section, and a second end part which is connected to the middle section. Moreover, the printed circuit board connection part includes a connection base which is assembled to the screwless clamping connection part, and a printed circuit board connection needle which is connected to the connection base, wherein the connection base is configured to define at least one soldering hole and a plurality of through holes. The second end part of the screwless clamping connection part is through the through holes defined by the connection base of the printed circuit board connection part and is configured to be fixed/stuck/stopped by the at least one fixing bump. The screwless clamping connection part is configured to be soldered and fixed to the printed circuit board connection part through the at least one soldering hole.

Moreover, in an embodiment of the cable television apparatus of the present disclosure mentioned above, the surrounding body includes a sliding column, and the support structure includes an upper support structure and a lower support structure. The upper support structure is assembled to the at least one rotary connector structure, and the lower support structure is assembled to the at least one rotary connector structure and the upper support structure. The lower support structure of the support structure includes a rotation-restricting wall, and the sliding column of the surrounding body is configured to slide against the rotation-restricting wall of the lower support structure to drive the at least one rotary connector structure to rotate to change the opening direction of the opening defined by the first end part of the screwless clamping connection part.

Moreover, in an embodiment of the cable television apparatus of the present disclosure mentioned above, the surrounding body includes a pushing column which is configured to be pushed to drive the at least one rotary connector structure to rotate to change the opening direction of the opening defined by the first end part of the screwless clamping connection part.

Moreover, in an embodiment of the cable television apparatus of the present disclosure mentioned above, the support structure includes an upper support structure which is assembled to the at least one rotary connector structure, and a lower support structure which is assembled to the at least one rotary connector structure and the upper support structure, and a signal-bypass metal elastic plate which is assembled to the lower support structure, and at least one signal-bypass support column which is assembled to the upper support structure and the lower support structure to touch the signal-bypass metal elastic plate.

Moreover, in an embodiment of the cable television apparatus of the present disclosure mentioned above, the cable television apparatus further includes an upper housing, a lower housing and a signal-processing printed circuit board. The support structure is arranged in the lower housing, and the signal-processing printed circuit board is arranged in the upper housing. Moreover, when the upper housing is assembled to the lower housing, the signal-processing printed circuit board is configured to be electrically connected to the printed circuit board connection part and the screwless clamping connection part of the at least one rotary connector structure, and the signal-processing printed circuit board is configured to push the at least one signal-bypass support column to press the signal-bypass metal elastic plate, so that the signal-bypass metal elastic plate is configured to deform and separate from the at least one rotary connector structure, so that a cable television signal of the coaxial cable core of the at least one coaxial cable flows through the screwless clamping connection part, the printed circuit board connection part and the signal-processing printed circuit board to be processed by the signal-processing printed circuit board. Moreover, when the upper housing is separated from the lower housing, the signal-bypass metal elastic plate is configured to be electrically connected to the printed circuit board connection part and the screwless clamping connection part of the at least one rotary connector structure, so that the cable television signal of the coaxial cable core of the at least one coaxial cable flows through the screwless clamping connection part, the printed circuit board connection part and the signal-bypass metal elastic plate to bypass the signal-processing printed circuit board.

The advantage of the present disclosure is to clamp the coaxial cable without screws and improve the high frequency characteristics.

Please refer to the detailed descriptions and figures of the present disclosure mentioned below for further understanding the technology, method and effect of the present disclosure achieving the predetermined purposes. It believes that the purposes, characteristic and features of the present disclosure can be understood deeply and specifically. However, the figures are only for references and descriptions, but the present disclosure is not limited by the figures.

DETAILED DESCRIPTION OF THE DISCLOSURE

Figure 10:
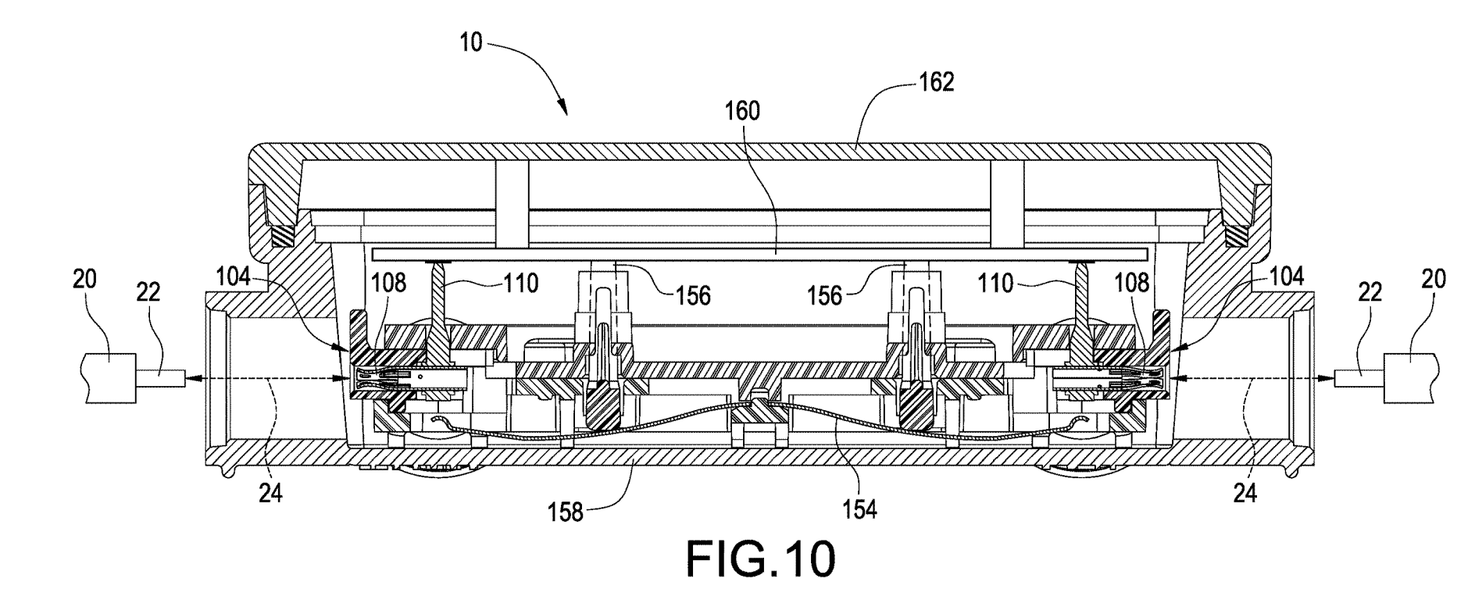
FIG. 10 shows a simple cross-sectional view of the cable television apparatus of the present disclosure when the upper housing is assembled to the lower housing.
Figure 11:
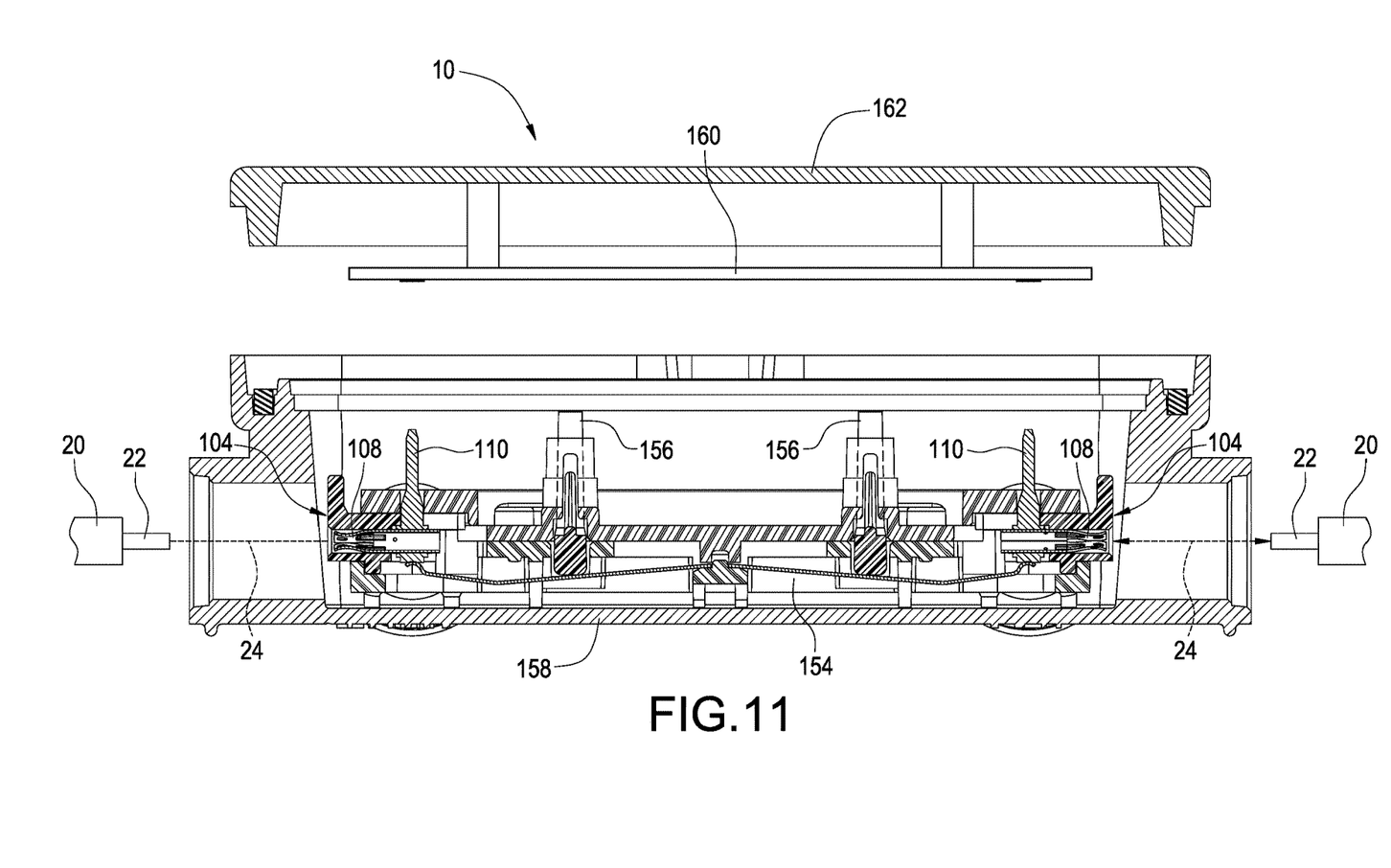
FIG. 11 shows a simple cross-sectional view of the cable television apparatus of the present disclosure when the upper housing is separated from the lower housing.

In the present disclosure, numerous specific details are provided, to provide a thorough understanding of embodiments of the disclosure. Persons of ordinary skill in the art will recognize, however, that the present disclosure can be practiced without one or more of the specific details. In other instances, well-known details are not shown or described to avoid obscuring aspects of the present disclosure. Now please refer to the figures for the explanation of the technical content and the detailed description of the present disclosure:

FIG. 10 shows a simple cross-sectional view of the cable television apparatus of the present disclosure when the upper housing is assembled to the lower housing, while FIG. 11 shows a simple cross-sectional view of the cable television apparatus of the present disclosure when the upper housing is separated from the lower housing. As shown in FIG. 10 and FIG. 11, a cable television apparatus 10 with a screwless clamping connector structure of the present disclosure is applied to at least one coaxial cable 20 which includes a coaxial cable core 22; the cable television apparatus 10 is applied to a signal frequency of 1.8 GHz or more, and the cable television apparatus 10 is applied to a current of 10 amperes or more.

Figure 1:
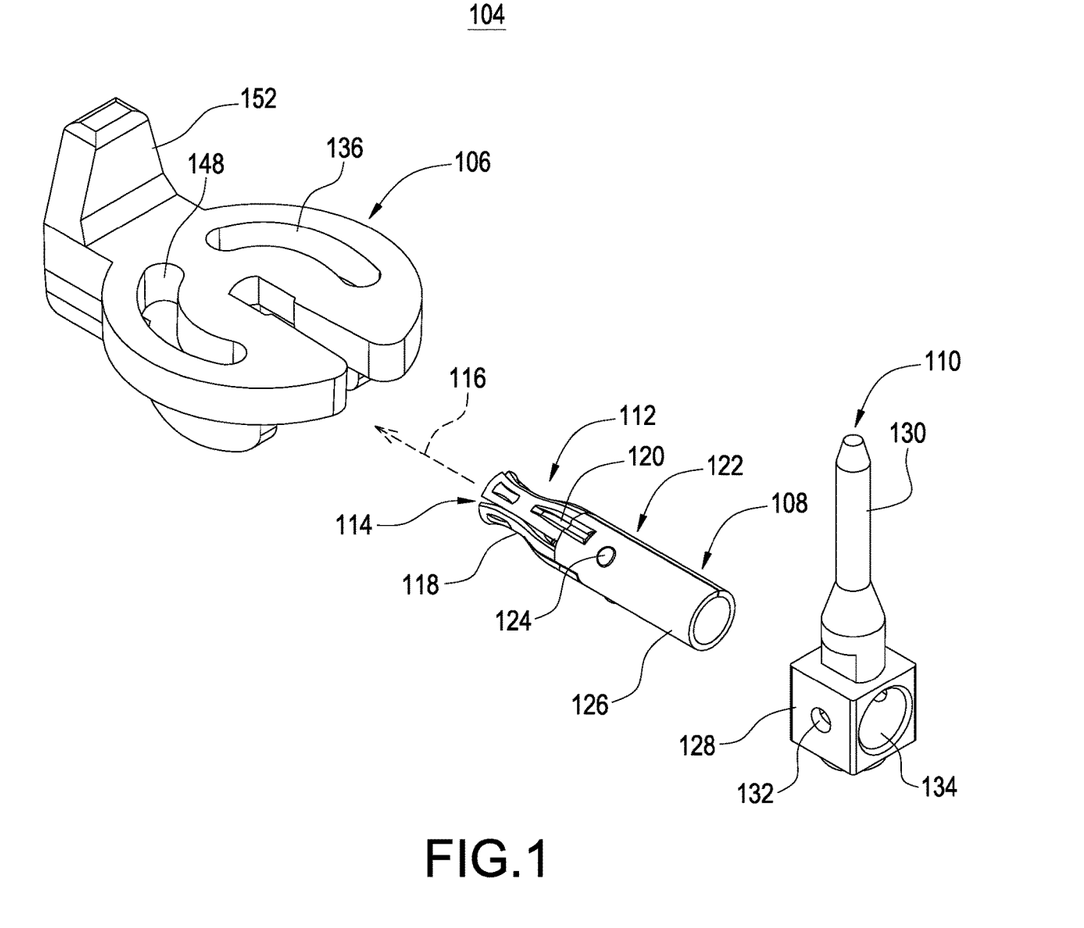
FIG. 1 shows an exploded view of the rotary connector structure of the present disclosure.
Figure 2:
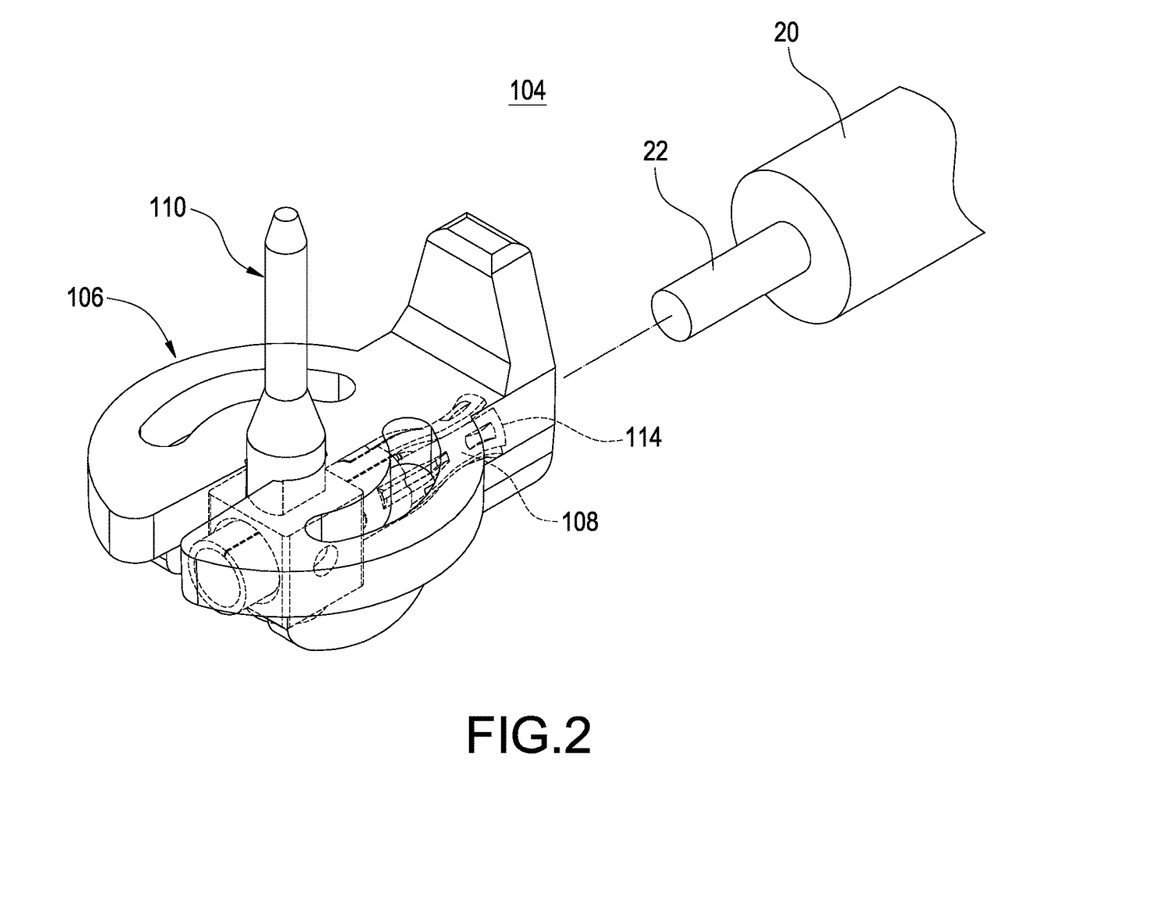
FIG. 2 shows an assembly perspective drawing of the rotary connector structure of the present disclosure.
Figure 3:
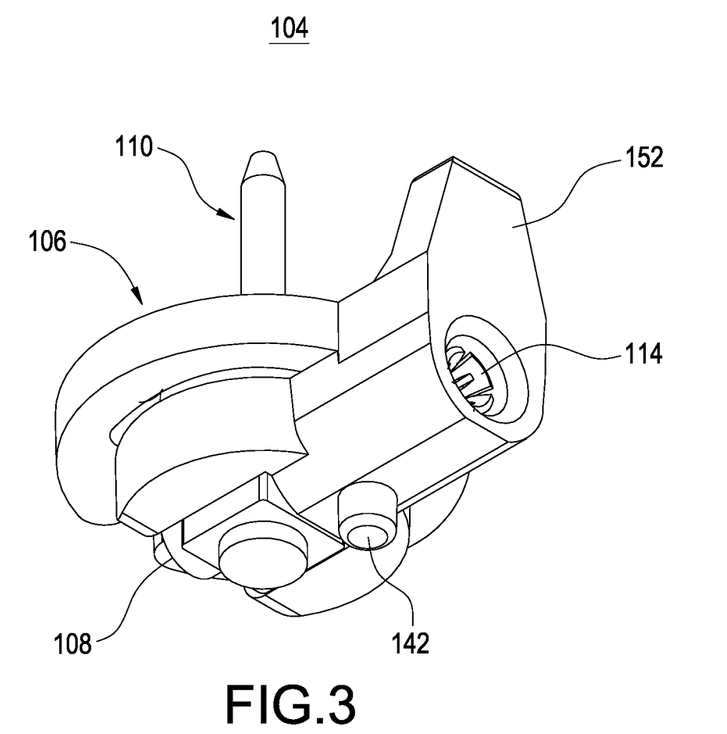
FIG. 3 shows an assembly drawing of the rotary connector structure of the present disclosure.
Figure 4:
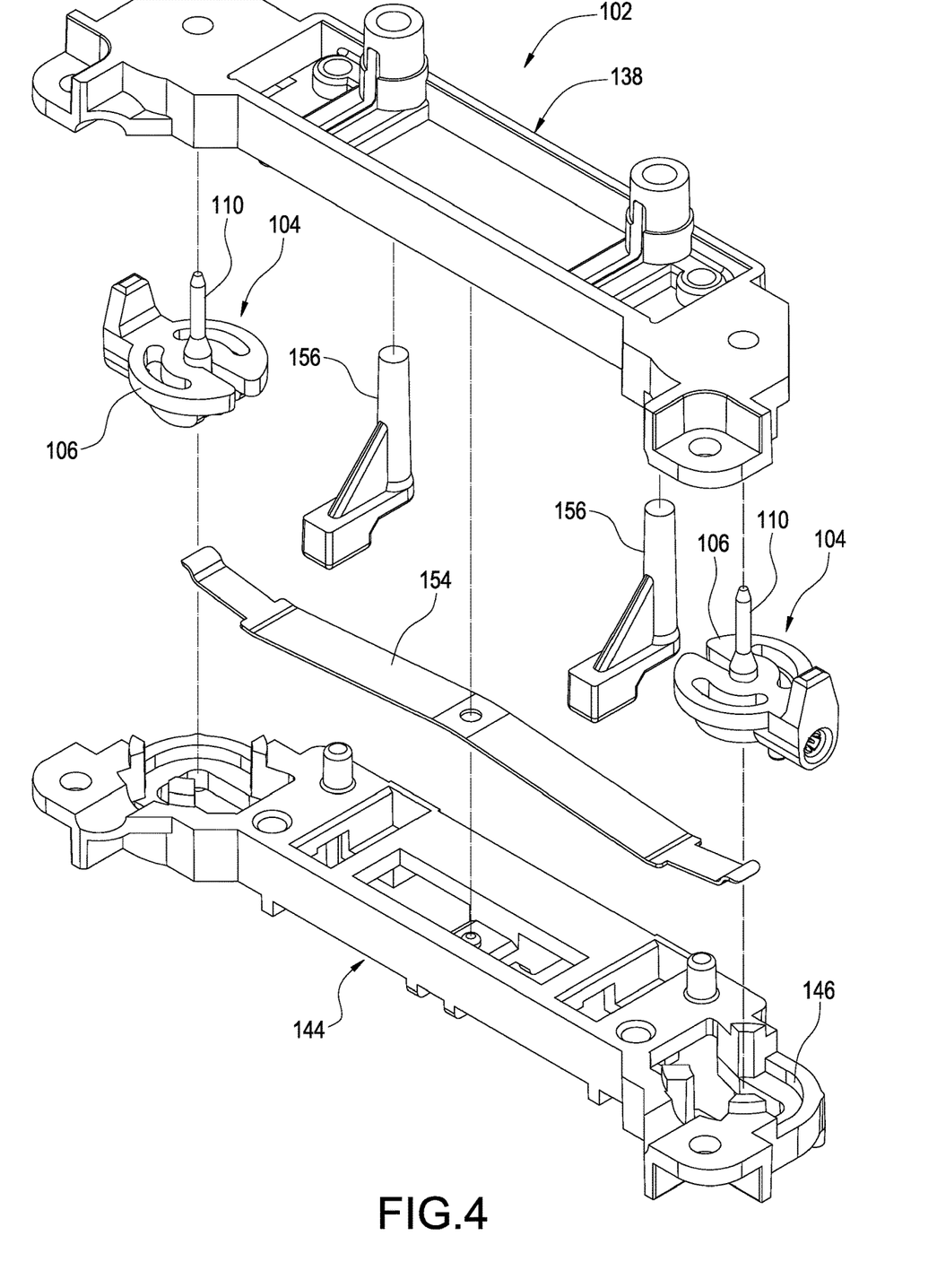
FIG. 4 shows an exploded view of the support structure and the rotary connector structure of the present disclosure.
Figure 5:
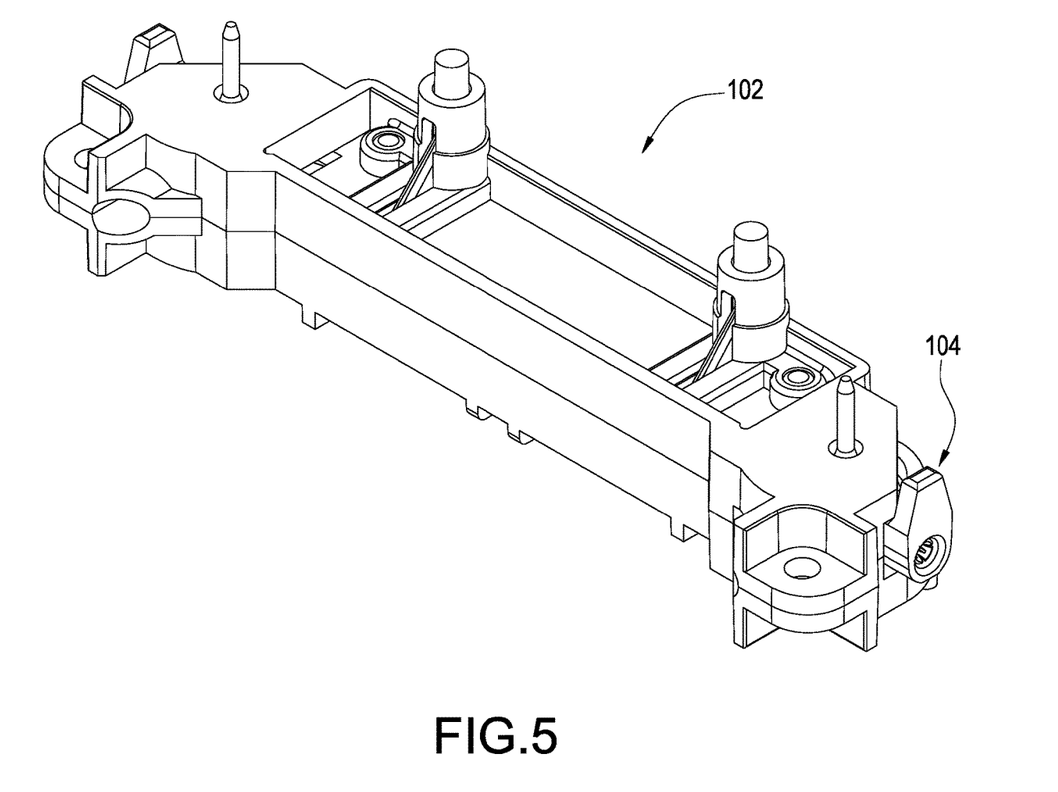
FIG. 5 shows an assembly drawing of the support structure and the rotary connector structure of the present disclosure.
Figure 8:
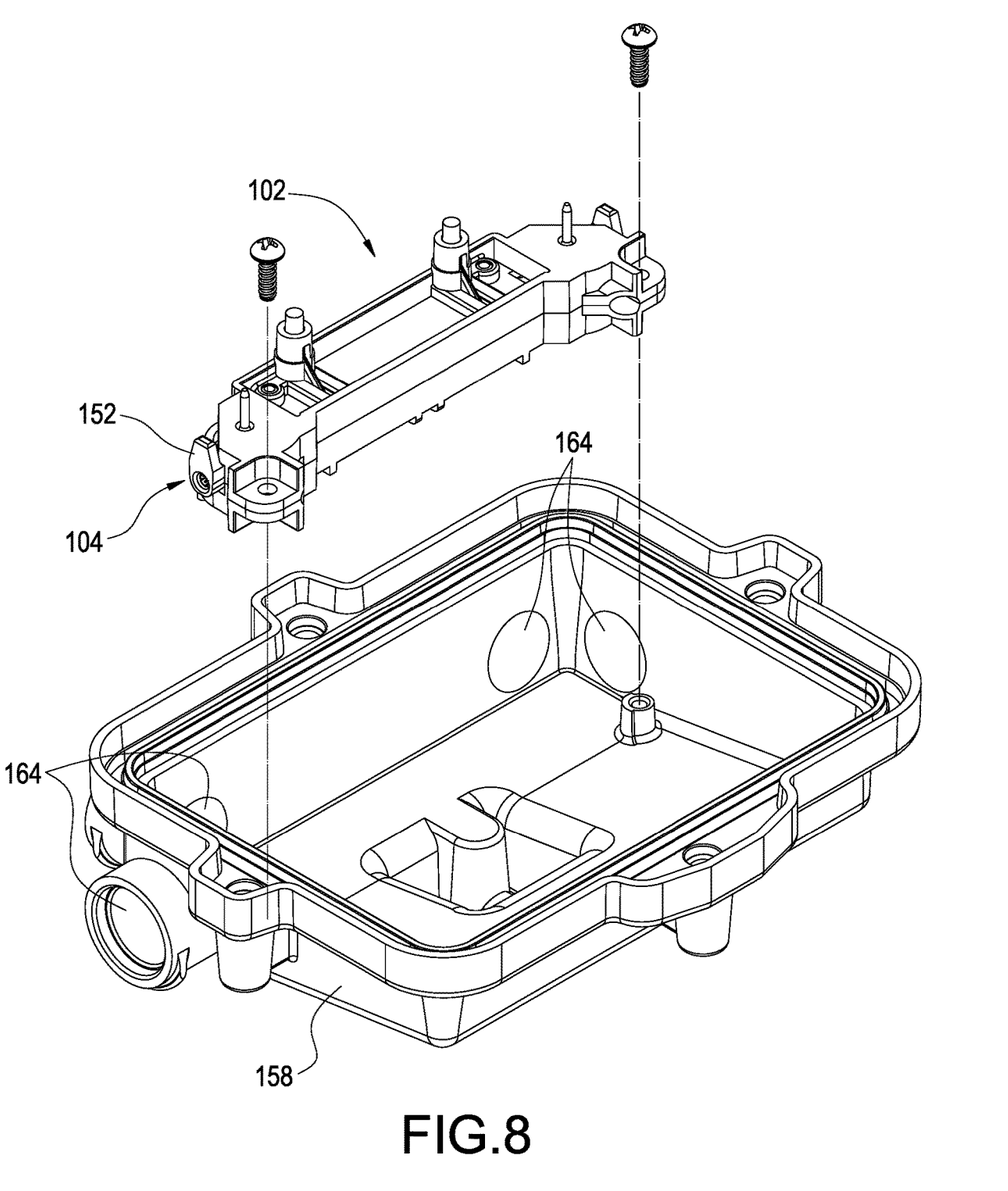
FIG. 8 shows an exploded view of the support structure, the rotary connector structure and the lower housing of the present disclosure.
Figure 9:
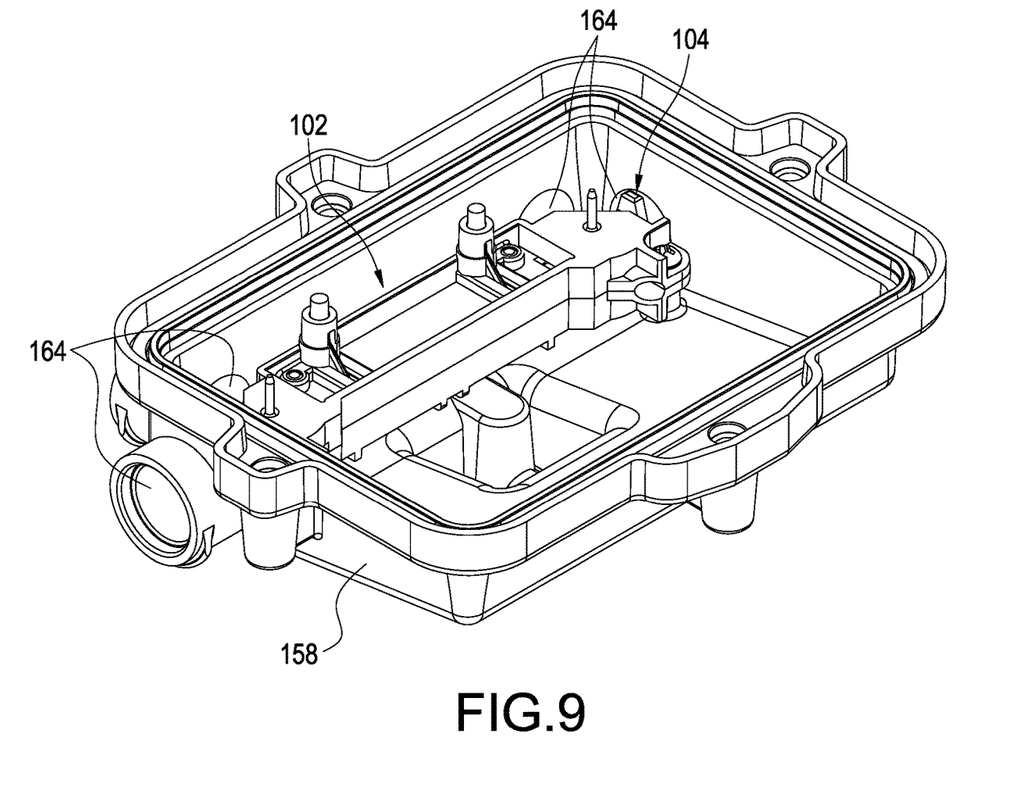
FIG. 9 shows an assembly drawing of the support structure, the rotary connector structure and the lower housing of the present disclosure.

FIG. 1 shows an exploded view of the rotary connector structure of the present disclosure; FIG. 2 shows an assembly perspective drawing of the rotary connector structure of the present disclosure; FIG. 3 shows an assembly drawing of the rotary connector structure of the present disclosure; FIG. 4 shows an exploded view of the support structure and the rotary connector structure of the present disclosure; FIG. 5 shows an assembly drawing of the support structure and the rotary connector structure of the present disclosure; FIG. 8 shows an exploded view of the support structure, the rotary connector structure and the lower housing of the present disclosure; FIG. 9 shows an assembly drawing of the support structure, the rotary connector structure and the lower housing of the present disclosure.

The cable television apparatus 10 (shown in FIG. 10 and FIG. 11) of the present disclosure includes a support structure 102 (shown in FIG. 4 and FIG. 5), at least one rotary connector structure 104 (shown in FIG. 4 and FIG. 5), an upper housing 162 (shown in FIG. 10 and FIG. 11), a lower housing 158 (shown in FIG. 8 to FIG. 11), and a signal-processing printed circuit board 160 (shown in FIG. 10 and FIG. 11). As shown in FIG. 4 and FIG. 5, the at least one rotary connector structure 104 is assembled to the support structure 102; as shown in FIG. 8 and FIG. 9, the support structure 102 and the at least one rotary connector structure 104 are arranged in the lower housing 158; as shown in FIG. 10 and FIG. 11, the signal-processing printed circuit board 160 is arranged in the upper housing 162.

As shown in FIG. 4, the support structure 102 includes an upper support structure 138, a lower support structure 144, a signal-bypass metal elastic plate 154, and at least one signal-bypass support column 156, while the lower support structure 144 includes a rotation-restricting wall 146. The upper support structure 138 is assembled to the at least one rotary connector structure 104, and the lower support structure 144 is assembled to the at least one rotary connector structure 104 and the upper support structure 138, and the signal-bypass metal elastic plate 154 is assembled to the lower support structure 144, and the at least one signal-bypass support column 156 is assembled to the upper support structure 138 and the lower support structure 144 to touch the signal-bypass metal elastic plate 154.

As shown in FIG. 1, the at least one rotary connector structure 104 includes a surrounding body 106, a screwless clamping connection part 108 and a printed circuit board connection part 110. Moreover, the surrounding body 106 is made of a metal or an insulating material; if the surrounding body 106 is made of the insulating material, the equal capacitance value can be omitted, and the high frequency characteristics can be better.

As shown in FIG. 2, the surrounding body 106 is assembled to the screwless clamping connection part 108 and the printed circuit board connection part 110, and is configured to cover the screwless clamping connection part 108 to be assembled to the support structure 102 shown in FIG. 4, while the printed circuit board connection part 110 is assembled to the screwless clamping connection part 108. As shown in FIG. 4, after the surrounding body 106, the screwless clamping connection part 108 and the printed circuit board connection part 110 are assembled to each other, the surrounding body 106 and the printed circuit board connection part 110 are assembled to the support structure 102.

As shown in FIG. 3, the surrounding body 106 includes a pushing column 152 and a sliding column 142, wherein the pushing column 152 is connected to the sliding column 142. As shown in FIG. 1, the surrounding body 106 is configured to define a first slide rail 136 and a second slide rail 148.

As shown in FIG. 1, the screwless clamping connection part 108 includes a first end part 112, a middle section 122, at least one fixing bump 124, and a second end part 126. The screwless clamping connection part 108 is configured to define a plurality of elastic grooves 120 on the first end part 112 which is configured to include a concave waist part 118. The middle section 122 is connected to the first end part 112, and the at least one fixing bump 124 is arranged on the middle section 122, and the second end part 126 is connected to the middle section 122, and the first end part 112 is configured to define an opening 114 having an opening direction 116.

As shown in FIG. 1 and FIG. 2, the opening 114 is used to receive the coaxial cable core 22 of the at least one coaxial cable 20, and the first end part 112 is configured to utilize the concave waist part 118 and the elastic grooves 120 to increase a clamping force of the first end part 112 to the coaxial cable core 22 of the at least one coaxial cable 20. As shown in FIG. 1 and FIG. 2, the surrounding body 106 is configured to bind the first end part 112, so that even if the first end part 112 loses its elasticity due to long-term use, the first end part 112 can still use the surrounding body 106 to clamp the coaxial cable core 22 of the at least one coaxial cable 20.

As shown in FIG. 1, the printed circuit board connection part 110 includes a connection base 128 and a printed circuit board connection needle 130. The connection base 128 is configured to define at least one soldering hole 132 and a plurality of through holes 134, and the printed circuit board connection needle 130 is connected to the connection base 128 which is assembled to the screwless clamping connection part 108, and the second end part 126 is through the through holes 134 and is configured to be fixed/stuck/ stopped by the at least one fixing bump 124, and the screwless clamping connection part 108 is configured to be soldered and fixed to the printed circuit board connection part 110 through the at least one soldering hole 132.

Figure 6:
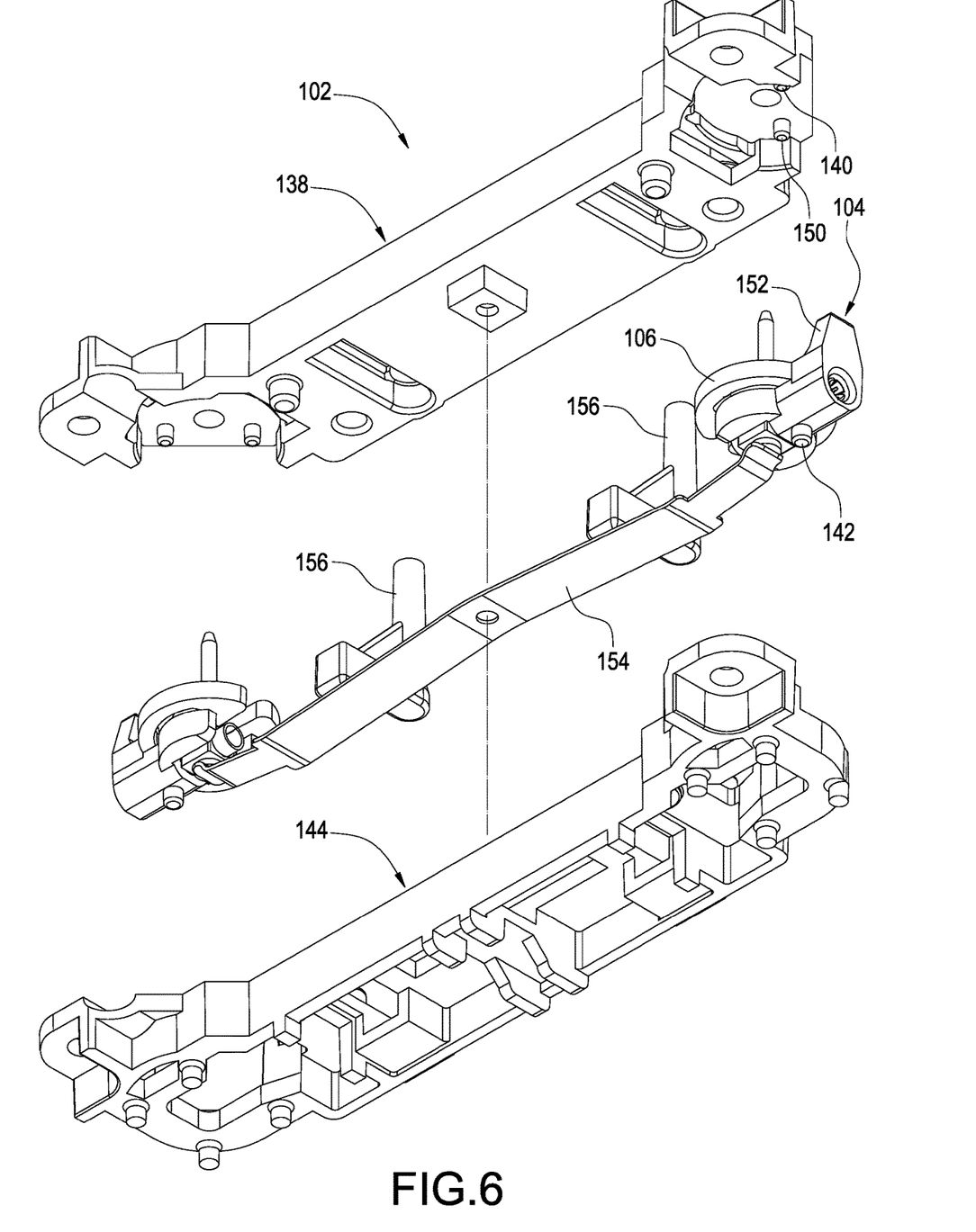
FIG. 6 shows an exploded view of the support structure and the rotary connector structure of the present disclosure from another visual angle.
Figure 7:
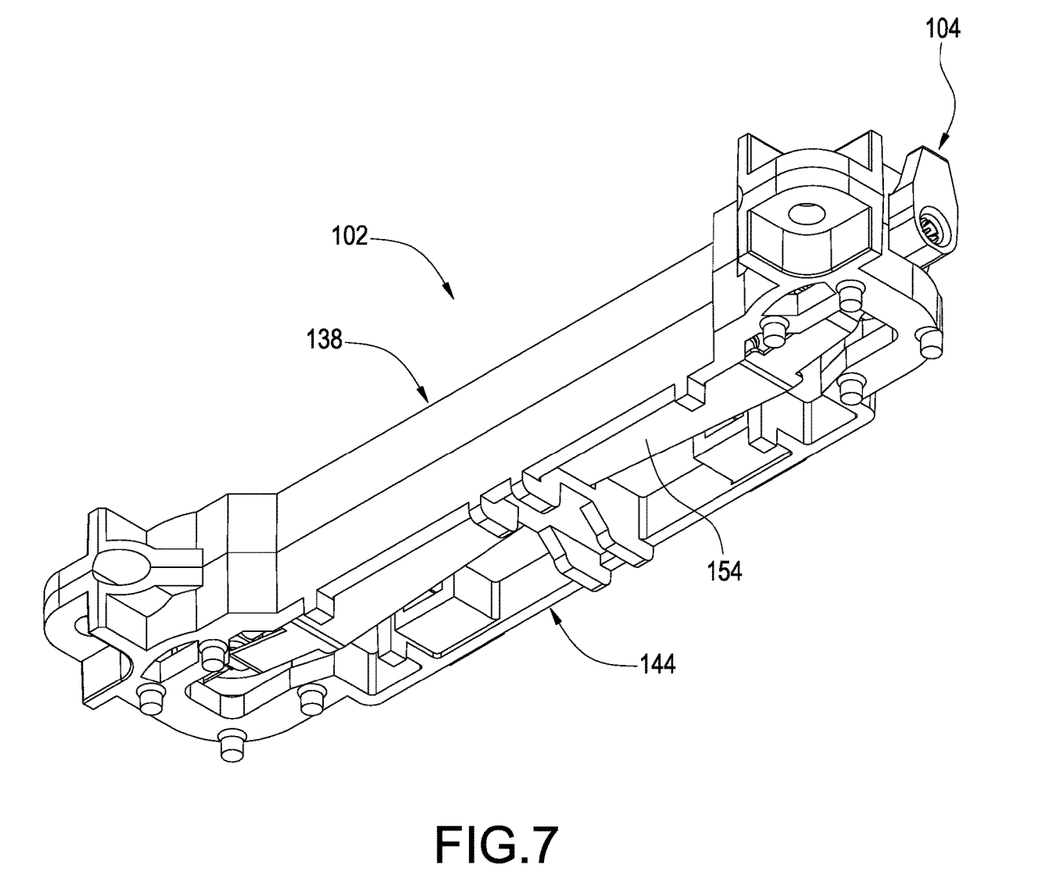
FIG. 7 shows an assembly drawing of the support structure and the rotary connector structure of the present disclosure.

FIG. 6 shows an exploded view of the support structure and the rotary connector structure of the present disclosure from another visual angle. FIG. 7 shows an assembly drawing of the support structure and the rotary connector structure of the present disclosure. As shown in FIG. 6, the upper support structure 138 includes a first protrusion 140 and a second protrusion 150, while the first protrusion 140 and the second protrusion 150 shown in FIG. 6 are respectively arranged in the first slide rail 136 and the second slide rail 148 shown in FIG. 1.

Referring to FIG. 6, the pushing column 152 is pushed so that the sliding column 142 slides against the rotation-restricting wall 146 shown in FIG. 4, and at the same time, the first slide rail 136 and the second slide rail 148 shown in FIG. 1 slide against the first protrusion 140 and the second protrusion 150 shown in FIG. 6 respectively, so as to drive the at least one rotary connector structure 104 of the present disclosure to rotate to change the opening direction 116 of the opening 114 shown in FIG. 1 and FIG. 2.

Moreover, referring to FIG. 8 and FIG. 9, the lower housing 158 is configured to define a plurality of holes 164, and the pushing column 152 is pushed by an object (not shown in FIG. 8 and FIG. 9; for example, a tweezers) through the holes 164 to drive the at least one rotary connector structure 104 of the present disclosure to rotate to change the opening direction 116 of the opening 114 shown in FIG. 1 and FIG. 2. In this way, the present disclosure does not need to separate the housing (namely, the upper housing 162 and the lower housing 158 shown in FIG. 10), and after the opening direction 116 of the opening 114 is changed, the coaxial cable 20 is arranged in a selected hole 164 of the holes 164 conveniently.

Referring to FIG. 10, when the upper housing 162 is assembled to the lower housing 158, the signal-processing printed circuit board 160 is configured to be electrically connected to the printed circuit board connection part 110 and the screwless clamping connection part 108 of the at least one rotary connector structure 104, and the signal-processing printed circuit board 160 is configured to push the at least one signal-bypass support column 156 to press the signal-bypass metal elastic plate 154, so that the signal-bypass metal elastic plate 154 is configured to deform and separate from the at least one rotary connector structure 104, so that a cable television signal 24 of the coaxial cable core 22 of the at least one coaxial cable 20 flows through the screwless clamping connection part 108, the printed circuit board connection part 110 and the signal-processing printed circuit board 160 to be processed by the signal-processing printed circuit board 160.

Referring to FIG. 11, when the upper housing 162 is separated from the lower housing 158, the signal-bypass metal elastic plate 154 is configured to be electrically connected to the printed circuit board connection part 110 and the screwless clamping connection part 108 of the at least one rotary connector structure 104, so that the cable television signal 24 of the coaxial cable core 22 of the at least one coaxial cable 20 flows through the screwless clamping connection part 108, the printed circuit board connection part 110 and the signal-bypass metal elastic plate 154 to bypass the signal-processing printed circuit board 160. Thereby, even if the upper housing 162 is separated from the lower housing 158 (for example, the housing is opened for maintenance), the cable television apparatuses at the rear end can still receive the cable television signal 24.

The advantage of the present disclosure is to clamp the coaxial cable without screws and improve the high frequency characteristics.

Although the present disclosure has been described with reference to the preferred embodiment thereof, it will be understood that the disclosure is not limited to the details thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. A cable television apparatus with a screwless clamping connector structure applied to at least one coaxial cable comprising a coaxial cable core, the cable television apparatus applied to a signal frequency of 1.8 ghz or more, the cable television apparatus applied to a current of 10 amperes or more, the cable television apparatus comprising:
    a support structure; and
    at least one rotary connector structure assembled to the support structure,
    wherein the at least one rotary connector structure comprises:
    a screwless clamping connection part; and
    a printed circuit board connection part assembled to the support structure and the screwless clamping connection part,
    wherein the screwless clamping connection part comprises a first end part; the first end part of the screwless clamping connection part is configured to define an opening to receive the coaxial cable core of the at least one coaxial cable; the at least one rotary connector structure is configured to be rotated to change an opening direction of the opening defined by the first end part of the screwless clamping connection part;
    wherein the at least one rotary connector structure further comprises a surrounding body assembled to the support structure, the screwless clamping connection part and the printed circuit board connection part; the surrounding body is configured to cover the screwless clamping connection part to be assembled to the support structure;
    wherein the surrounding body is configured to bind the first end part of the screwless clamping connection part, so that the first end part of the screwless clamping connection part is configured to use the surrounding body to clamp the coaxial cable core of the at least one coaxial cable; the first end part of the screwless clamping connection part is configured to comprise a concave waist part;
    wherein the surrounding body comprises a pushing column; the pushing column of the surrounding body is configured to be pushed to drive the at least one rotary connector structure to rotate to change the opening direction of the opening defined by the first end part of the screwless clamping connection part.

2. The cable television apparatus of claim 1, wherein the screwless clamping connection part is configured to define a plurality of elastic grooves on the first end part; the first end part of the screwless clamping connection part is configured to use the concave waist part and the elastic grooves to increase a clamping force of the first end part to the coaxial cable core of the at least one coaxial cable.

3. The cable television apparatus of claim 1, wherein the screwless clamping connection part further comprises:
    a middle section connected to the first end part;
    at least one fixing bump arranged on the middle section; and
    a second end part connected to the middle section,
    wherein the printed circuit board connection part comprises:
    a connection base assembled to the screwless clamping connection part; and
    a printed circuit board connection needle connected to the connection base,
    wherein the connection base is configured to define at least one soldering hole and a plurality of through holes; the second end part of the screwless clamping connection part is through the through holes defined by the connection base of the printed circuit board connection part and is configured to be fixed by the at least one fixing bump; the screwless clamping connection part is configured to be soldered and fixed to the printed circuit board connection part through the at least one soldering hole.

4. A cable television apparatus with a screwless clamping connector structure applied to at least one coaxial cable comprising a coaxial cable core, the cable television apparatus applied to a signal frequency of 1.8 ghz or more, the cable television apparatus applied to a current of 10 amperes or more, the cable television apparatus comprising:
    a support structure; and
    at least one rotary connector structure assembled to the support structure,
    wherein the at least one rotary connector structure comprises:
    a screwless clamping connection part; and
    a printed circuit board connection part assembled to the support structure and the screwless clamping connection part,
    wherein the screwless clamping connection part comprises a first end part; the first end part of the screwless clamping connection part is configured to define an opening to receive the coaxial cable core of the at least one coaxial cable; the at least one rotary connector structure is configured to be rotated to change an opening direction of the opening defined by the first end part of the screwless clamping connection part;
    wherein the at least one rotary connector structure further comprises a surrounding body assembled to the support structure, the screwless clamping connection part and the printed circuit board connection part; the surrounding body is configured to cover the screwless clamping connection part to be assembled to the support structure;
    wherein the surrounding body is configured to bind the first end part of the screwless clamping connection part, so that the first end part of the screwless clamping connection part is configured to use the surrounding body to clamp the coaxial cable core of the at least one coaxial cable; the first end part of the screwless clamping connection part is configured to comprise a concave waist part;
    wherein the surrounding body comprises a sliding column; the support structure comprises an upper support structure and a lower support structure; the upper support structure is assembled to the at least one rotary connector structure; the lower support structure is assembled to the at least one rotary connector structure and the upper support structure; the lower support structure of the support structure comprises a rotation-restricting wall; the sliding column of the surrounding body is configured to slide against the rotation-restricting wall of the lower support structure to drive the at least one rotary connector structure to rotate to change the opening direction of the opening defined by the first end part of the screwless clamping connection part.

5. A cable television apparatus with a screwless clamping connector structure applied to at least one coaxial cable comprising a coaxial cable core, the cable television apparatus applied to a signal frequency of 1.8 ghz or more, the cable television apparatus applied to a current of 10 amperes or more, the cable television apparatus comprising:
  a support structure; and
  at least one rotary connector structure assembled to the support structure,
  wherein the at least one rotary connector structure comprises:
  a screwless clamping connection part; and
  a printed circuit board connection part assembled to the support structure and the screwless clamping connection part,
  wherein the screwless clamping connection part comprises a first end part; the first end part of the screwless clamping connection part is configured to define an opening to receive the coaxial cable core of the at least one coaxial cable; the at least one rotary connector structure is configured to be rotated to change an opening direction of the opening defined by the first end part of the screwless clamping connection part;
  wherein the at least one rotary connector structure further comprises a surrounding body assembled to the support structure, the screwless clamping connection part and the printed circuit board connection part; the surrounding body is configured to cover the screwless clamping connection part to be assembled to the support structure;
  wherein the surrounding body is configured to bind the first end part of the screwless clamping connection part, so that the first end part of the screwless clamping connection part is configured to use the surrounding body to clamp the coaxial cable core of the at least one coaxial cable; the first end part of the screwless clamping connection part is configured to comprise a concave waist part;
  wherein the support structure comprises:
  an upper support structure assembled to the at least one rotary connector structure;
  a lower support structure assembled to the at least one rotary connector structure and the upper support structure;
  a signal-bypass metal elastic plate assembled to the lower support structure; and
  at least one signal-bypass support column assembled to the upper support structure and the lower support structure to touch the signal-bypass metal elastic plate.

6. The cable television apparatus of claim 5, further comprising an upper housing, a lower housing, and a signal-processing printed circuit board, wherein the support structure is arranged in the lower housing; the signal-processing printed circuit board is arranged in the upper housing;
  wherein when the upper housing is assembled to the lower housing, the signal-processing printed circuit board is configured to be electrically connected to the printed circuit board connection part and the screwless clamping connection part of the at least one rotary connector structure, and the signal-processing printed circuit board is configured to push the at least one signal-bypass support column to press the signal-bypass metal elastic plate, so that the signal-bypass metal elastic plate is configured to deform and separate from the at least one rotary connector structure, so that a cable television signal of the coaxial cable core of the at least one coaxial cable flows through the screwless clamping connection part, the printed circuit board connection part and the signal-processing printed circuit board to be processed by the signal-processing printed circuit board;
  wherein when the upper housing is separated from the lower housing, the signal-bypass metal elastic plate is configured to be electrically connected to the printed circuit board connection part and the screwless clamping connection part of the at least one rotary connector structure, so that the cable television signal of the coaxial cable core of the at least one coaxial cable flows through the screwless clamping connection part, the printed circuit board connection part and the signal-bypass metal elastic plate to bypass the signal-processing printed circuit board.

* * * * *